United States Patent [19]

Tanaka et al.

[11] Patent Number: 4,933,587

[45] Date of Patent: Jun. 12, 1990

[54] DC MOTOR HAVING IMPROVED CONTACT BETWEEN COMMUTATOR AND ARMATURE

[75] Inventors: Toshinori Tanaka; Souichi Yoshino, both of Himeji, Japan

[73] Assignee: Mitsubishi Denki Kabushiki Kaisha, Japan

[21] Appl. No.: 265,802

[22] PCT Filed: Feb. 10, 1988

[86] PCT No.: PCT/JP88/00134

§ 371 Date: Oct. 11, 1988

§ 102(e) Date: Oct. 11, 1988

[87] PCT Pub. No.: WO88/06356

PCT Pub. Date: Aug. 25, 1988

[30] Foreign Application Priority Data

Feb. 12, 1987 [JP] Japan .................................. 62-30016

[51] Int. Cl.⁵ ............................................. H02K 13/04
[52] U.S. Cl. ..................................... 310/233; 310/45; 310/71; 310/234
[58] Field of Search ........................ 310/232–237, 310/71, 219, 45, 177

[56] References Cited

U.S. PATENT DOCUMENTS

| | | | |
|---|---|---|---|
| 732,235 | 6/1903 | Swan | 310/234 |
| 3,664,012 | 5/1972 | Wilke | 310/235 |
| 4,584,498 | 4/1986 | Strobl | 310/71 |
| 4,656,380 | 4/1987 | Strobl | 310/71 |
| 4,764,700 | 8/1988 | Strobl | 310/71 |
| 4,769,627 | 9/1988 | Baines | 310/71 |
| 4,833,769 | 5/1989 | Tomite | 310/236 |

FOREIGN PATENT DOCUMENTS

| | | | |
|---|---|---|---|
| 0226627 | 2/1960 | Australia | 310/235 |
| 0472440 | 3/1971 | Canada | 310/235 |
| 1126020 | 3/1962 | Fed. Rep. of Germany | 310/235 |
| 1223885 | 6/1960 | France . | |
| 0160955 | 12/1980 | Japan . | |
| 0009242 | 1/1982 | Japan . | |

*Primary Examiner*—R. Skudy
*Attorney, Agent, or Firm*—Leydig, Voit & Mayer

[57] ABSTRACT

The armature of an engine starter direct current (d.c.) motor comprises a rotary shaft, an aluminum armature coil. The commutator a commutator disposed on the rotary shaft and has a plurality of copper commutator segments each including a main body portion having a sliding contact surface and a connecting portion having an aluminum connecting surface. The aluminum armature coil is electrically and mechanically connected to each of the aluminum connecting surfaces of the commutator segments to form an electrical and mechanical connection therebetween. The electrical and mechanical connection between the aluminum connecting surface and the armature coil is coated with an electrically insulating resin.

2 Claims, 3 Drawing Sheets

DC MOTOR HAVING IMPROVED CONTACT BETWEEN COMMUTATOR AND ARMATURE

TECHNICAL FIELD

This invention relates to a dc motor and a method for manufacturing a d/c, motor and, more particularly, to a dc motor for an engine starter including an improved commutator.

BACKGROUND ART

A conventional d.c. motor for use in an engine starter is constructed as illustrated in FIG. 1, from which it is seen that the conventional d.c. motor comprises a rotary shaft 3 on which an armature core 2 is firmly secured by means of splines 1 formed on the circumferential surface of the rotary shaft 3. A commutator 4 is mounted on one end portion of the rotary shaft 3.

The commutator 4 comprises a plurality of commutator segments 5 made of copper mounted at equal circumferential intervals on a resin portion 6 made of an electrically insulating material which is secured on the rotary shaft 3 through a bushing 8. The commutator 4 comprises a cylindrical sliding contact portion 4a on which brushes (not shown) of the motor are brought into a sliding contact relationship and a large-diameter connecting portion 4b provided at a first end of the sliding contact portion 4a. Each of the commutator segments 5 extends in a substantially axial direction over both the sliding contact portion 4a and the connection portion 4b. Radially outer ends of the connection portions 4b of the segments 5 are electrically connected to an end of an armature coil 7 wound on the armature core 2.

The armature coils of many of such d.c. motors are made of an aluminum conductor due to its lightweight, and the mechanical and electrical connection between thee aluminum coil conductor and the copper connection portion 4b of the commutator segment 5 has been achieved by the ultrasonic welding of these two different materials.

However, it is difficult to obtain sufficient mechanical strength between the aluminum conductor and the copper segment through ultrasonic welding. Also, the weld is inferior in terms of corrosion resistance.

While it has been proposed to interpose a layer such as of nickel or tin between the aluminum. conductor and the copper segment, the mechanical strength obtained has not been satisfactory.

DISCLOSURE OF INVENTION

Accordingly, the present invention has been made in order to solve the above discussed problems of the conventional starter d.c. motor, and has as its object the provision of a d.c. motor in which an armature coil made of aluminum wound on an armature core is mechanically joined firmly to a commutator segment made of copper.

Another object of the present invention is to provide a method for manufacturing a d.c. motor in which an armature coil made of an aluminum conductor wound on an armature core can be mechanically joined firmly to a commutator segment made of copper.

The armature of an engine starter d.c. motor of the present invention comprises a rotary shaft, an aluminum armature coil and a commutator disposed on the rotary shaft, with a plurality of copper commutator segments each including a sliding contact surface and an aluminum connecting surface. The aluminum armature coil is electrically and mechanically connected to the aluminum connecting surface of the commutator segments to form an electrical and mechanical connection therebetween.

The electrical and mechanical connection between the segment sliding contact surface and the armature coil may be coated with an electrically insulating resin.

The method for manufacturing a d.c. motor armature of the present invention comprises the steps of inserting a copper tube into an aluminum tube and firmly putting them together to form a composite tube; forging the composite tube to form a plurality of axially extending grooves in the inner surface of the composite tube; forming an electrically insulating segment carrier member on the grooved inner surface of the composite tube; partly removing material from the aluminum tube, the copper tube and the insulating carrier member to form an essentially cylindrical commutator assembly, on the outer surfaces of which copper sliding contact surfaces of the commutator segments and aluminum connecting surfaces are exposed and electrically isolated from each other; and electrically and mechanically connecting the aluminum armature coil to the aluminum connecting surface of the segments, whereby a firm and reliable electrical and mechanical connection is established between the armature coil and the commutator.

According to the present invention, since the aluminum armature coil is electrically and mechanically connected to the aluminum sliding contact surface securely attached to the commutator segments, a superior electrical and mechanical connection can be established between the armature coil and the commutator.

BRIEF DESCRIPTION OF DRAWINGS

The present invention will become more readily apparent from the following detailed description of the preferred embodiment of the present invention taken in conjunction with the accompanying drawings, in which.

BEST MODE FOR CARRYING OUT THE INVENTION

Figure 2:
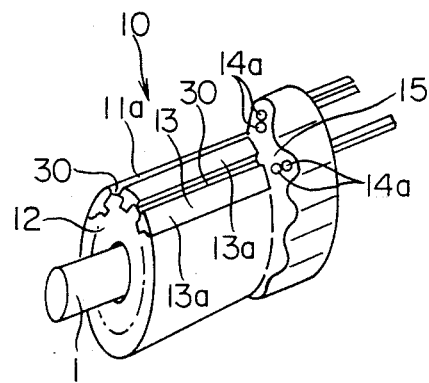
FIG. 2 is a perspective view showing the commutator of the d.c. motor armature of an embodiment of the present invention.
Figure 3:
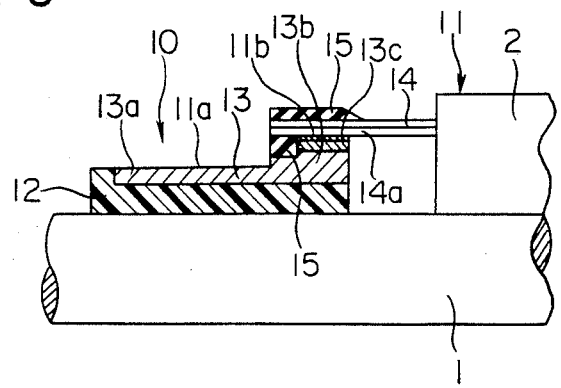
FIG. 3 is a sectional view of the commutator shown in FIG. 2

FIGS. 2 and 3 illustrate a commutator 10 of a d.c. motor armature 11 for an engine starter constructed in accordance with the present invention.

Figure 1:
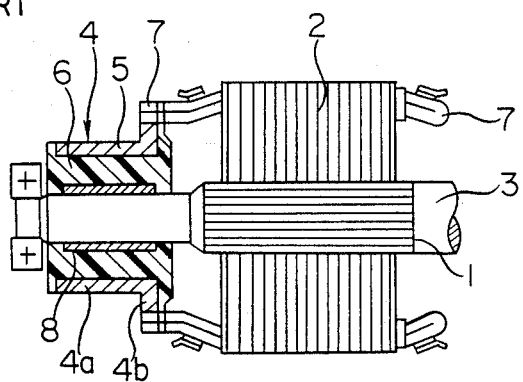
FIG. 1 is a longitudinal cross-sectional view of an armature of a conventional d.c. motor for use in an engine starter.

The motor armature 11 of the present invention is the same as the conventional armature shown in FIG. 1 except for the structure of the commutator 10. Therefore, the structure of the commutator 10 and its manufacturing method will be mainly described, and the other structure will not be described in detail.

The commutator 10 is a substantially tubular member securely mounted on the rotary shaft 1 of the d.c. motor. The armature 11 of the present invention comprises a rotary shaft 1 which is to be rotatably supported in a motor stator (not shown). The rotary shaft 1 has mounted thereon an armature core 2 on which an armature coil 14 is wound. The armature coil 14 is made of an aluminum coil conductor and is firmly connected electrically and mechanically at its conductor end 14a to the commutator 10.

The commutator 10 of the armature 11 of the present invention includes a cylindrical segment carrier member 12 made of an electrically insulating resin secured to the rotary shaft 1 for rotation therewith. A bushing may be interposed between the carrier member 12 and the rotary shaft 1 in order to establish a more reliable mechanical connection therebetween. The carrier member 12 has mounted on the outer circumference thereof a plurality of commutator segments 13 which are to be in sliding contact with brushes (not shown) of the motor for current commutation.

The commutator segments 13 are axially elongated members made of copper and isolated in the circumferential direction from the adjacent segments 13 by the insulating resin material of the carrier member 12. Each of the segments 13 includes a main body portion 13a and a connecting portion 13b slightly raised from the main body portion 13a. The main body portion 13a has a sliding contact surface 11a to which the brushes (not shown) of the motor contact, and the connecting portion 13b is a first end of the segment 13. The connecting portion 13b has aluminum connecting surface 11b which is defined by an aluminum layer 13c mechanically and electrically attached firmly thereto. The aluminum connecting layer on the copper connecting portion 13b of the segment 13 may be formed by a process including the steps of placing aluminum tube over a copper tube and cold forging and machining them which will be described in detail later. The commutator segments 13 may be said to be embedded in the segment carrier 12, and their sliding contact surfaces 11a are along the same cylindrical surface as the circumferential surface of the insulating carrier member 12, so that the cylindrical outer circumferential surface of the commutator 10 is smooth and continuous.

As best seen from FIG. 3, the conductor ends 14a of the aluminum armature coil 14 are electrically and mechanically connected to the connecting surface 11b of the aluminum layer 13c by ultrasonic welding to establish a firm mechanical and electrical connection between the armature coil 14 and the commutator 10.

According to the present invention, the armature of the engine starter motor is manufactured by the method including the steps illustrated in FIGS. 4 to 13.

Figure 4:
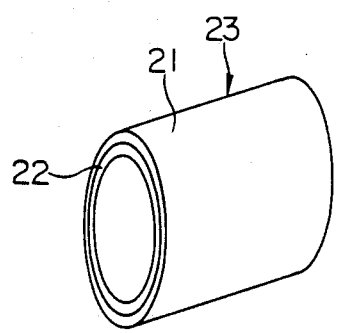
FIG. 4 is a perspective view showing the composite tube for use in manufacturing the commutator of FIG. 2.
Figure 5:
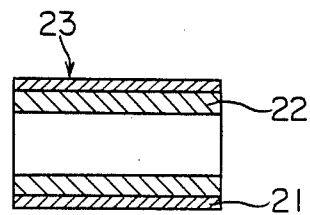
FIG. 5 is longitudinal cross-sectional view of the composite tube FIG. 4.

As shown in FIGS. 4 and 5, an aluminum tube 21 is placed over a copper tube 22, and these two tubes 21 and 22 are firmly put together by an explosive bonding or a HIP method to form a composite tube 23.

Figure 6:
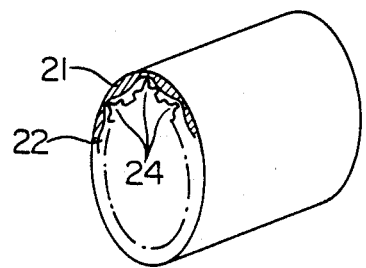
FIG. 6 is a perspective view of the composite tube in the manufacturing step in which it is cold forged.
Figure 7:
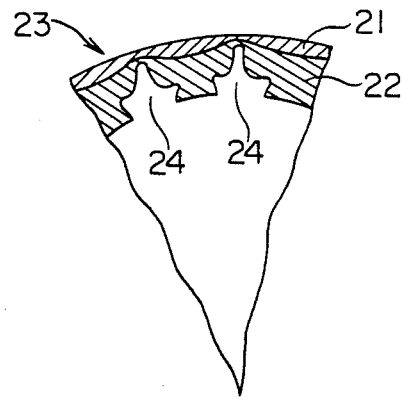
FIG. 7 is a fragmental cross-sectional view of the cold forged composite tube shown in FIG. 6.

This composite tube 23 is cold forged to form a plurality of axially extending grooves 24 in the inner surface of the composite tube 23 as shown in FIGS. 6 and 7. Each of the grooves 24 has a cross-sectional configuration which provides a suitable dove-tail slot for holding the commutator segment therein when the manufacture of the commutator has been completed.

Figure 8:
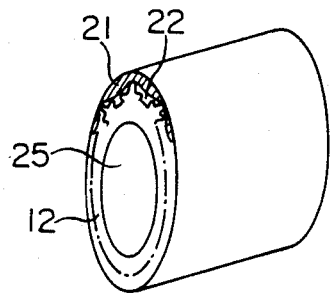
FIG. 8 is a perspective view showing the step in which the resin segment carrier member is formed inside the cold forged composite tube shown in FIG. 6.
Figure 9:
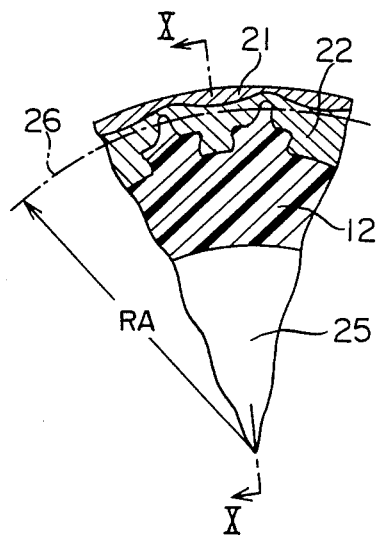
FIG. 9 is a fragmental cross-sectional view of the composite tube of FIG. 8.
Figure 10:
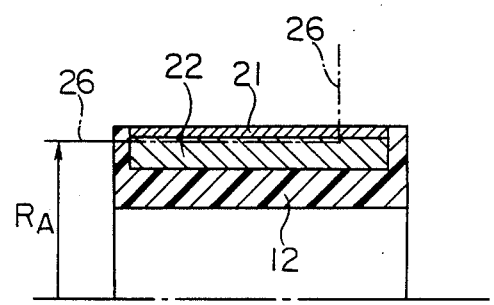
FIG. 10 a sectional view of the composite tube taken along line X—X of FIG. 9.

FIGS. 8, 9 and 10 illustrate the step in which an electrically insulating segment carrier member 12 is formed by resin molding on the inner surface of the composite tube 23. The segment carrier member 12 is made of an electrically insulating resin and has a central bore 25 through which the armature rotary shaft 1 extends to be secured thereto by pressure fit.

Figure 11:
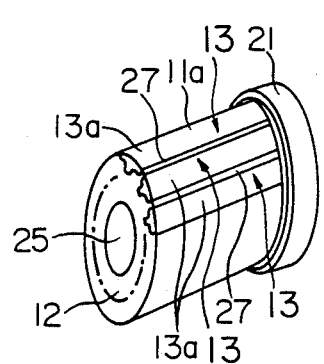
FIG. 11 is a perspective view showing the step of forming the sliding contact surface of the commutator.

The assembly thus constructed is then machined to partly remove the aluminum tube 21, the copper tube 22 and the insulating carrier member 12 along cutting lines 26 shown in FIGS. 9 and 10 to provide a machined assembly as shown in FIG. 11. It is seen in FIG. 11 that the machined assembly is essentially cylindrical and has a central bore 25 and a large-diameter portion having a ring of the aluminum layer 21 at one end. In the cylindrical surface of the main body portion of the machined assembly, a plurality of copper segments 13 are exposed to extend in the axial direction and are circumferentially separated by electrically insulating surfaces 27 of the segment carrier member 12. However, the segments 13 are still in connection with each other in the large-diameter ring portion which has the aluminum layer 21.

Figure 12:
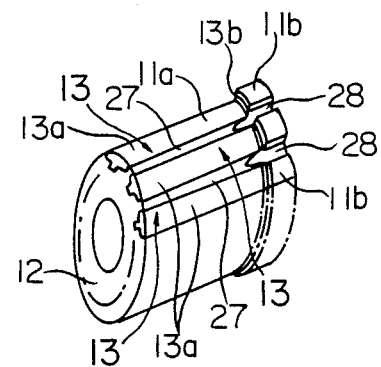
FIG. 12 is a perspective view showing the step of forming the isolated connecting portions of the commutator segments.

In FIG. 12, the large-diameter portion with the aluminum layer 21 thereon is machined to form axial grooves 28 at the circumferential positions corresponding to the positions of the separating space filled by the insulating carrier member 12 so that the commutator segments 13 are completely isolated by the grooves 28. Each of the segments 13 thus-constructed is of a substantially L-shape, and one of the legs of the "L" extending in the axial direction, which is the main portion 13a of the segment 13, is mechanically supported by means of the dove-tail structure at its position and he segment carrier member 12. The other leg of the "L", which is the connecting portion 13b of the segment 13, is separated by the groove 28 and has the discrete aluminum layer 13c on its radially outer end face.

Figure 13:
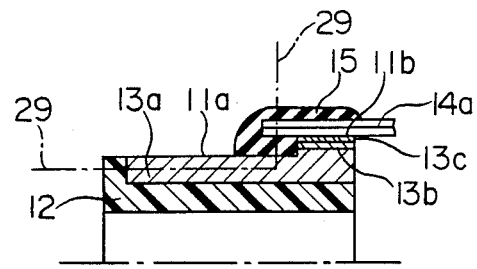
FIG. 13 is a sectional view showing the step of removing the insulating coating on the electrical and mechanical connections between the coil conductors and the commutator segment.

As illustrated in FIG. 13, after the commutator 10 is manufactured as described above, the conductor ends 14a of the aluminum armature coil 14 are electrically and mechanically connected by ultrasonic welding to the aluminum connecting surfaces 11b of the aluminum layers 13c of the connecting portions 13b of the segments 13. It is to be noted that since the aluminum conductor ends 14a are welded to the connecting surface 11b of the aluminum layer 13c which is firmly attached to the copper connecting portions 13b of the segments 13, the electrical and the mechanical connection between the armature coil 14 and the commutator 10 is firm and reliable.

FIG. 13 also illustrates that the connection between the conductor ends 14a and the commutator segment connecting portion 13b is coated by an electrically insulating resin 15. This coating of the insulating resin 15 is useful in protecting the aluminum components against corrosion. Finally, the redundant portion of the commutator is removed by machining along a cutting line 29 in FIG. 13 so that the commutator 10 has the desired precise dimensions, and the insulating material 27 of the carrier member 1 exposed between the segments 13 is removed to form axially extending grooves 30 as shown in FIG. 2.

According to the present invention, the aluminum conductor ends 14a are welded to the connecting surface 11b of the aluminum layer 13c which is firmly attached to the copper connecting portions 13b of the segments 13, the electrical and the mechanical connection between the armature coil 14 and the commutator 10 is firm and reliable. Also, the coating of the electrically insulating resin 15 on the connection between the coil conductor and the commutator is useful in protecting the aluminum components of the commutator against corrosion.

While the segment carrier member described in conjunction with the above embodiment does not have the bushing 8 shown in FIG. 1, a suitable bushing similar to the bushing 8 shown in FIG. 1 may be provided in the inner circumferential surface of the segment carrier member 12. Also, while the cutting line 26 shown in FIGS. 9 and 10 along which the assembled commutator is machined has a radius of curvature RA and passes through the grooves 24 (FIGS. 6 and 7) or the radially outward tips of the carrier member 12, the radius of curvature RA may be suitably selected as long as the machining of the connecting portion and the sliding contact surface of the commutator can be effectively achieved.

We claim:

1. A d.c. motor for an engine starter comprising:
a rotary shaft;
an aluminum armature coil disposed on said rotary shaft for rotation therewith;
a commutator disposed on said rotary shaft for rotation therewith and having a plurality of copper commutator segments, each of said commutator segments including a main body portion having a sliding contact surface and a connecting portion having an aluminum connecting surface electrically and mechanically integral with said connecting portion, said connecting portion being provided at a first end of each of said commutator segments;
said aluminum armature coil being electrically and mechanically connected to said aluminum connecting surface of said connecting portion of each of said commutator segments to form an electrical and mechanical connection therebetween.

2. A starter dc motor as claimed in claim 1 wherein said electrical and mechanical connection between said aluminum connecting surface of said commutator segments and said armature coil is coated with an electrically insulating material.

* * * * *

UNITED STATES PATENT AND TRADEMARK OFFICE
CERTIFICATE OF CORRECTION

PATENT NO. : 4,933,587
DATED : June 12, 1990
INVENTOR(S) : Tanaka et al.

It is certified that error appears in the above-identified patent and that said Letters Patent is hereby corrected as shown below:

Title page:

In item [57], in the Abstract, lines 3 and 4, change "coil. The commutator a commutator disposed on the rotary shaft and" to --coil and a commutator disposed on the rotary shaft. The commutator--.

Column 6, line 25, (claim 2), change "starter dc" to --d.c.--.

Signed and Sealed this

Third Day of September, 1991

Attest:

HARRY F. MANBECK, JR.

*Attesting Officer*      *Commissioner of Patents and Trademarks*